UNITED STATES PATENT OFFICE.

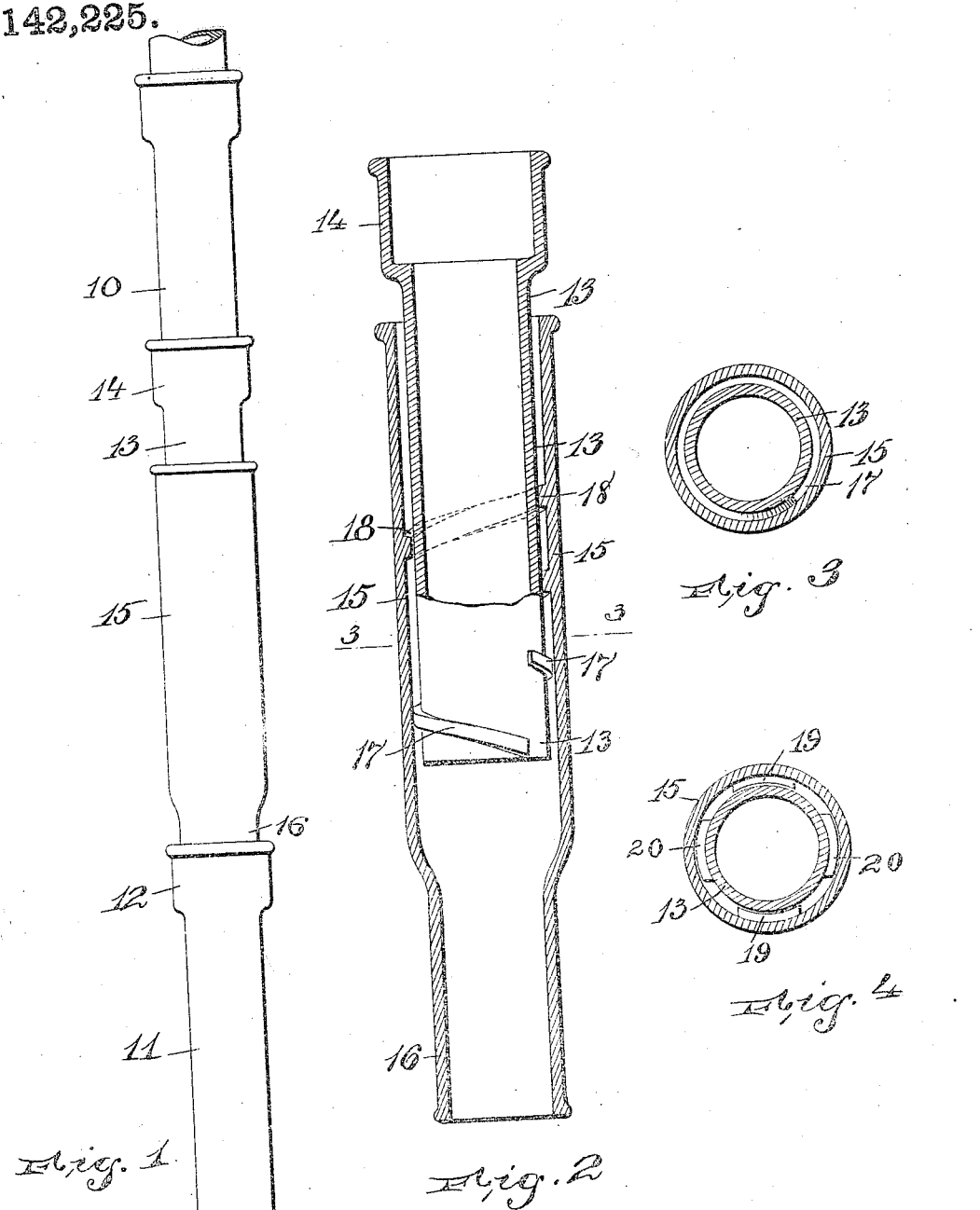

NATHAN AUGUST, JR., OF NEWARK, NEW JERSEY.

PLUMBER'S FIXTURE.

1,142,225.

Specification of Letters Patent.   Patented June 8, 1915.

Application filed July 18, 1912.   Serial No. 710,245.

*To all whom it may concern:*

Be it known that I, NATHAN AUGUST, Jr., a citizen of the United States, residing at Newark, in the county of Essex and State of New Jersey, have invented certain new and useful Improvements in Plumbers' Fixtures; and I do hereby declare the following to be a full, clear, and exact description of the invention, such as will enable others skilled in the art to which it appertains to make and use the same, reference being had to the accompanying drawing, and to figures of reference marked thereon, which form a part of this specification.

This invention relates to a repair section or device which is made in the form of a fixture to be placed in a line of pipe to take the place of a portion of pipe that needs to be cut out on account of a leak.

It is particularly adapted for use in water or sewer pipes, or similar conduits, which are made of lengths of pipe which have a bell on one end, the bell of one section going over the small end of the next section and being properly calked in place to form a continuous pipe. When a section breaks it is necessary, very often, to cut out the broken portion to the bell on the next adjacent pipe, and then cut a new piece of pipe, including its bell, to approximately fit the section of pipe that is cut out, but long enough to have its bell embrace the remaining portion of the broken pipe and its small end in the bell of the pipe next adjacent. This is unsatisfactory very often on account of the calking not having a good seat and thus permitting some of the lead to flow inside of the pipe. Pipes very often repaired this way settle and cause new breaks, and it is to correct these defects that I have devised the invention herein described.

The fixture described herein comprises two members, a male member and a female member, the male member being telescopically arranged in the female member, the two members having co-acting means within them for holding the two members in adjusted positions, this means also acting as a stop or limitation for the hemp gasket used in the calking, and also acting to hold the members extended when they are being placed in the line of pipe and permit both ends to be placed in close abutment against the adjacent sections of pipe into which they are being fitted.

The invention is illustrated in the accompanying drawing, in which—

Figure 1 is a side view of a portion of a line of pipe with the repair fixture inserted in it. Fig. 2 is a section of the fixture. Fig. 3 is a section on line 3, 3, in Fig. 2, and Fig. 4 is a section on the same line, but showing a modified form of construction.

In the drawing to illustrate the use of the fixture I have shown a section of pipe 10 and a section of pipe 11 which were originally joined, and the section 10, when the line of pipe was in good order, extended down into the bell 12 of the pipe 11. If this section 10 developed a leak it would be necessary to either put a patch on it, or else cut out that part of the pipe that was damaged way down and including the part within the bell 12, cut a new section of pipe, including its bell so that the bell of the new section of pipe would go on the cut end of the section 10 and the small end of the new piece would go into the bell 12, but in order to get this section of pipe in, it would have to be cut short so that when put in at an angle down into the bell 12, it could be swung perpendicular under the section 10 and then raised enough to have its own bell embrace the bottom end of the section 10. This makes an unsatisfactory fixture and one in which the repairing is not satisfactory very often on account of the pipe settling down and also on account of its not making tight abutting joints to hold the calking material against entrance into the line of pipe.

My fixture embodies a male member 13 which has a bell portion 14 forming an enlarged end, the other member being a female member 15 which has a reduced end 16, the female member being larger than the male member 13 so as to provide a space between them for the insertion of calking material for making a joint between the two members when they are to be placed in a line of pipe. When a break occurs in the pipe, and the broken part of the pipe has been cut out as shown in Fig. 1, the female member 15 has its small end 16 inserted down in the bell 12 and the male member 13 is lowered telescopically so that it goes under the end of the section 10. The member 13 is then lifted to have its bell embrace the small end of the section 10, and then by turning one or both of the sections in the proper direction, the helical rib 17, forming a screw-thread on the outside of the member 13 at its bottom, will engage the helical rib 18 on the inside of the female member 15 so as to force the two members apart longitudinally and cause their ends to engage the abutting ends of the pipe sections to form tight joints to limit the entrance of calking material, this locking means, that is, the helical ribs themselves forming a limit for the hemp gasket, or for other material or articles used in the calking operation.

In lieu of the helical ribs I may use lugs 19 on the member 15 and lugs 20 on the member 13, these lugs being adapted to be passed by each other through the spaces between them and then turned so that they are in register so that the lugs 20 will rest on the lugs 19 and support the members in extended position. Sets of the lugs 19 can be placed on different elevations to allow for the different heights at which the member 13 is to be held.

Having thus described my invention, what I claim is;—

A repair fixture for flanged pipes comprising a male member having an enlarged outer end, the member having a sleeve-like portion of considerable length with a helical rib on its inner end, a female member to contain the sleeve-like portion of the male member, the female member being of substantially the same diameter, except for a reduced outer end, and a short helical rib on the inside of the female member substantially equi-distant between its inner end and the reduced outer end, the last mentioned helical rib being adapted to receive the helical rib of the male member and also to act as a limit to the entrance of calking material.

In testimony, that I claim the foregoing, I have hereunto set my hand this 16th day of July 1912.

NATHAN AUGUST, Jr.

Witnesses:
WM. H. CAMFIELD,
M. A. JOHNSON.